INVENTOR
John E. Henne
BY Williamson, Williamson,
Schroeder & Adams ATTORNEYS

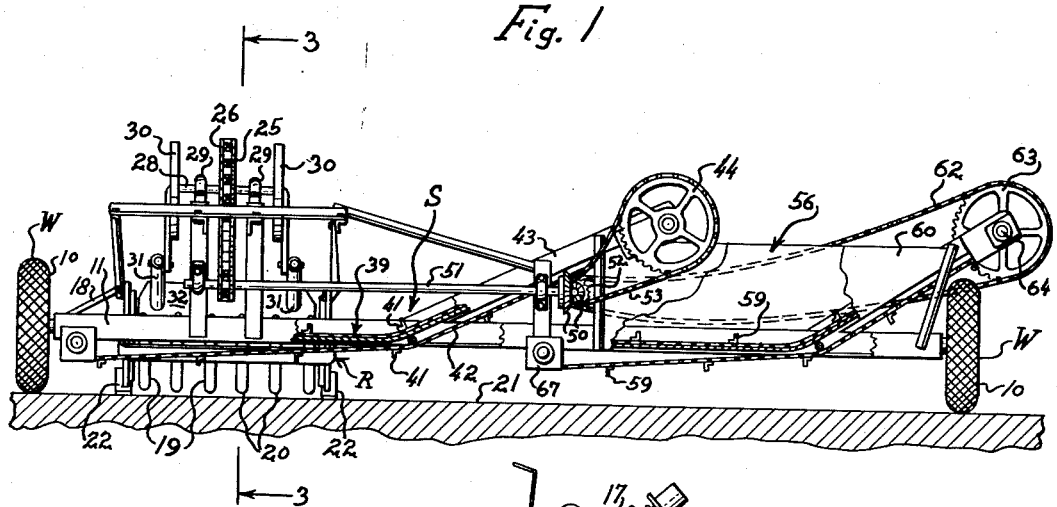
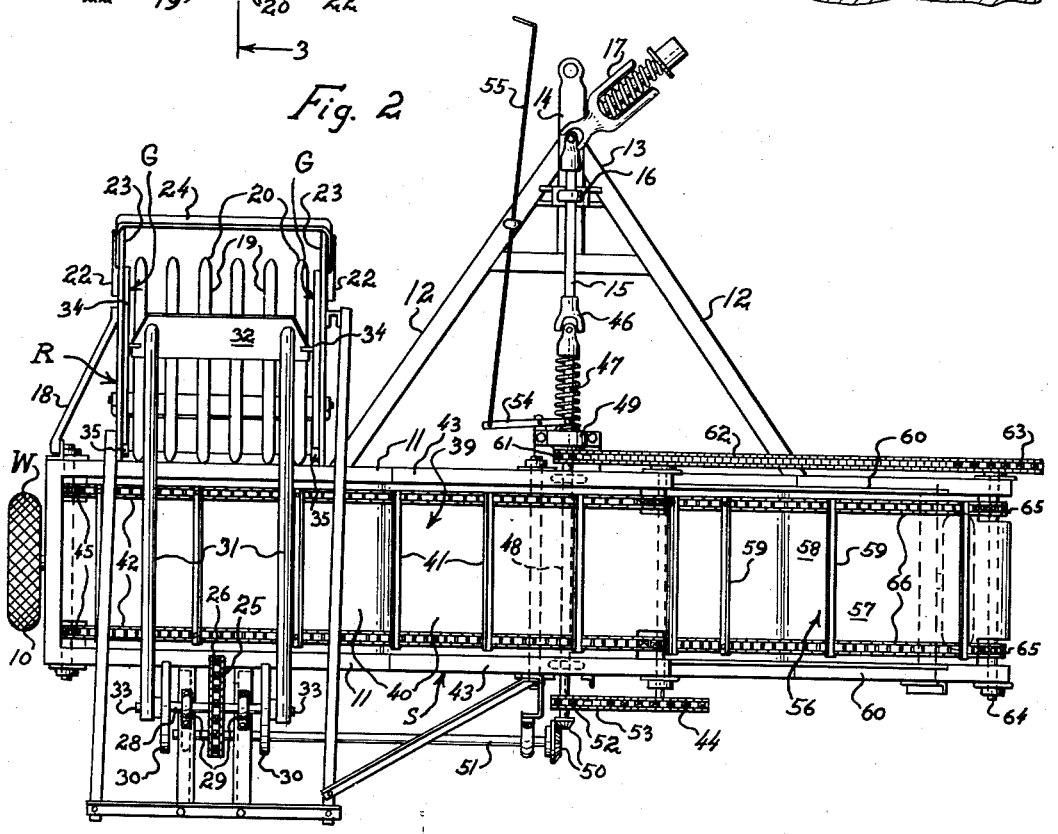

United States Patent Office 2,732,673
Patented Jan. 31, 1956

2,732,673

ROCK COLLECTING APPARATUS HAVING A RECIPROCABLE GATHERING BLADE

John E. Henne, Alfred, N. Dak.

Application August 18, 1952, Serial No. 305,021

2 Claims. (Cl. 55—17)

This invention relates to a rock collecting apparatus and more particularly to an implement adapted to be drawn across a rocky field for picking up and discharging rocks during the clearing of the field.

It is an important object of the invention to provide for an efficient device of the class described which will give a minimum of trouble during operation and will effectively pick up, accumulate and discharge rocks collected from a field to be cleared for agricultural purposes.

Another object of the invention is to provide for a rock collecting device having adjustably affixed tines or teeth in close proximity to the surface of a field and reciprocating thereover a single collector blade which will intermittently scoop up a quantity of rocks in a positive and simple manner without allowing them to become locked or stuck in the device.

It is a further object of the invention to provide for a novel and simple rock collecting device having a scoop arrangement which is reciprocated in such a manner as to conserve upon the amount of driving energy while still obtaining a positive and trouble-free operation.

It is still a further object to provide for a simple and efficient rock collecting device which can be operated for both gathering rocks and depositing them in intermittent piles with the requirement of but a single operator.

These and other objects and advantages of my invention will more fully appear from the following description made in connection with the accompanying drawings wherein like reference characters refer to the same or similar parts throughout the several views and in which:

Fig. 1 is a rear elevation of my rock collection apparatus showing the rock scooping assembly and the conveying means mounted upon the wheeled supporting structure;

Fig. 2 is a plan view of my device showing the driving connection and clutch means for operation of the various parts;

Figure 3:
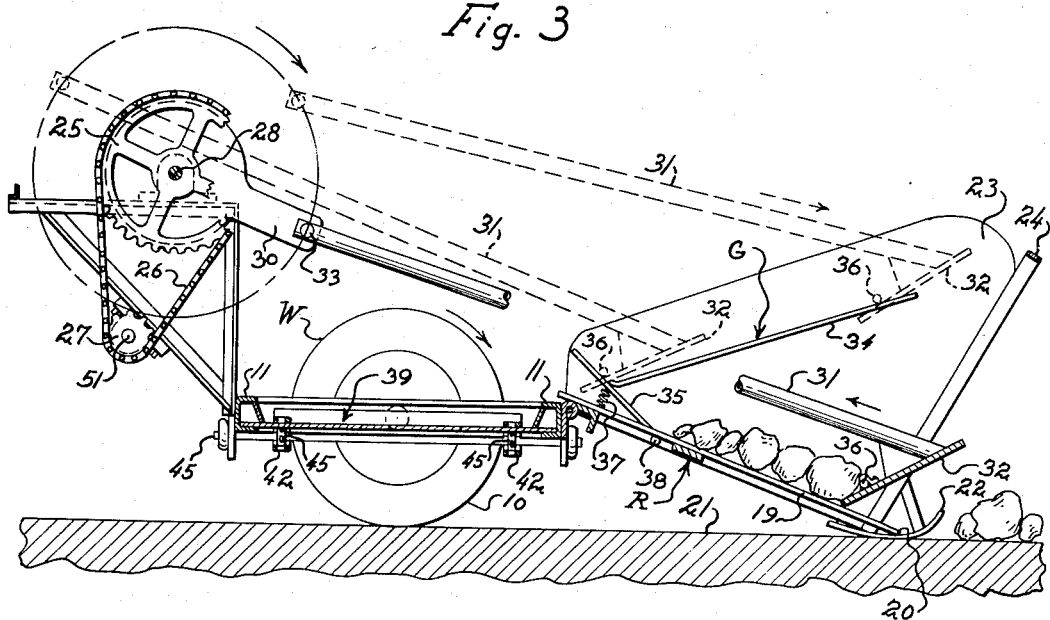
Fig. 3 is an enlarged vertical section through the rock scooping assembly taken on the line 3—3 of Fig. 1.

Referring now more particularly to the drawings, my rock collecting device comprises a supporting structure S which has connected therewith ground contacting members W for traveling over the terrain, such as the rubber-tired wheels 10. The supporting structure comprises a frame 11 having forwardly extending braces 12 which converge at an apex 13 to form a drawbar 14 for attachment to a vehicle, such as a tractor (not shown). Mounted adjacent the drawbar 14 is a shaft 15 journalled at 16 and supplied with a universal connector 17 which is adapted to be connected with the power take-off of the vehicle.

Secured to the frame 11 of the supporting structure S, is a rock-scooping assembly R which may be further braced by such means as rods 18. The rock-scooping assembly R has forwardly and downwardly pointed tines or teeth 19 which are adapted to lie close to the surface of the terrain, as shown in Fig. 3. These tines or teeth 19 are preferably parallel so as to prevent the lodging or binding of rocks therebetween during the collecting operation. The forwardly and downwardly extending points 20 of the tines or teeth 19 may be adjusted relative to the surface 21 of the terrain by means of skids or shoes 22 placed at either side of the teeth or tines 19. Extending upwardly from the plane of the teeth or tines 19 and at each side thereof, is a sideboard 23. A U-shaped brace 24 may extend between the sideboards 23 to give them additional support. Journalled rearwardly of the supporting structure S in a sprocket member 25 which is driven through such means as chain 26 by sprocket pinion 27. The driven sprocket 25 has a shaft 28 rotatably mounted in journals 29 and has secured thereto a crank member 30. A reciprocable element comprising parallel arms 31 and a hoe-like blade 32 is pivotally secured to the crank 30 at 33.

A cooperative guide mechanism G, which is important to the efficient operation of my apparatus, comprises a fixed track means 34 and resiliently pivoted track means 35, both of which may be attached to the inner faces of the sideboards 23. Also included in my cooperative guide mechanism are abutment members 36 which are fixed to the reciprocable member, preferably upon the hoe blade 32 for sliding engagement with the track means. A compression spring 37 may form the resilient actuator for the tracks 35 and may be positioned between the plane of the teeth or tines 19 and the underside of each of the tracks 35. One end of each of the tracks 35 is pivotally mounted at 38 adjacent the plane of the teeth 19 and the surface of the sideboards 23 so as to abut the lower end of each of the tracks 34 which are also secured to the inner face of sideboards 23.

Referring now to Fig. 1 and Fig. 2, a rock pick-up conveyor 39 generally comprises a series of aprons 40 having upstanding flanges 41 secured thereto in parallel relation. The aprons 40 may be mounted upon a pair of link chains 42 which in turn are guided in an endless fashion between frame members 43. The chains 42 are driven by sprocket wheel 44 journaled across the frame members 43 at the upper end thereof. At the lower end, the chain members 42 may be mounted for reverse rotation on the idler sprockets 45 which are journaled across the frame members 43 at the lowermost end thereof. The driving mechanism for the reciprocating hoe member 32 and the conveyor 39 is connected to the shaft 15 through the universal joint 46 which in turn drives the shaft 47 and shaft 48 through the clutch mechanism 49. Beveled gears 50 form a driving connection between the shaft 48 and the counter-shaft 51. The counter-shaft 51 has secured thereto the pinion sprocket 27 which in turn drives the sprocket 25 as heretofore described. Also mounted upon the shaft 48 is a pinion sprocket 52 which drives the sprocket 44 through chain member 53. Thus the driving sprockets 25 and 44 are both driven simultaneously through the take-off connector 17 when clutch 49 is so engaged. A manual clutch lever 54 is operable through rod 55 for the purpose of engaging or dis-engaging clutch 49. It will be noted that the conveyor belt 39 travels to the right and upwardly as viewed in Figs. 1 and 2 so as to carry rocks laterally and upwardly upon the apparatus. After dropping from the conveyor belt 39, the rocks fall down into an accumulator 56 which is secured to the supporting structure S. At its bottom another conveyor belt 57 which, similarly to the conveyor 39, has apron sections 58 and parallel flange members 59. The conveyor belt 57 is mounted for sliding movement between frame members 60, a portion of which lies laterally to the rock collecting apparatus and at the bottom of accumulator 56, and the sideways extension of which is in an upwardly and raised direction. Pinion sprocket 61 is secured axially to the shaft 48 and drives through chain 62 the sprocket 63 which in turn is journaled on shaft 64 across the upper ends of frame 60. Sprockets 65 are fixed to the shaft 64 and form the direct driving connection for chains 66 which in turn carry the apron and flange members 58 and 59 as previously described. At the lower end of the discharge conveyor 57, the chain elements 66 turn on idler sprockets 67.

In the operation of my rock collecting apparatus, the drawbar 14 is attached to a vehicle such as a tractor which is capable of pulling the apparatus across the terrain with the teeth or tine elements 19 in contact with or extending slightly into the surface of the terrain. The universal connector 17 is attached to the power take-off of the vehicle which will set the driving mechanism into motion. The clutch rod 55 is then actuated by the operator so as to throw into engagement the pinion sprocket 52 with the shaft 47 through clutch 49. Shaft 51 will simultaneously be rotated through the same driving mechanism and the crank 30 set into rotative movement so as to reciprocate the blade 32 over the plane of the teeth or tines 19. As the apparatus is pulled along the ground, rocks lying at the surface thereof or slightly into the surface will be dislodged by the points 20 of teeth 19 and caused to gather over the parallel teeth in crowded association. The crank element 30 will rotate in a clockwise direction as viewed in Fig. 3 which will bring the arms 31 backwardly so as to scrape a collection of rocks along the plane of teeth 19 up onto the conveyor 39 which is operating to convey the rocks laterally to the right as shown in Fig. 2. As the blade 32 approaches the conveyor 39 the abutments 36 will engage resilient tracks 35 and cause them to yield against compression springs 37 while pivoting at 38. Since the blade 32 is angled forwardly and backwardly with respect to the plane of teeth 19, the rocks in contact therewith will cause a downward pressure component aiding in keeping the blade 32 in contact with the surface of the teeth 19. The tracks 35 will continue to be depressed under the influence of abutment members 36 until all the rocks are discharged therefrom at the most rearwardly positioned of the blade during the rotative cycle of crank 30. Immediately upon the beginning of the return movement of arms 31 as illustrated by the lowermost dotted line position in Fig. 3, the forward impetus of the arms 31 and blade 32 together with the releases from the rocks which had hitherto tended to hold the blade 32 down, the resilient tracks 35 will spring upwardly under the influence of compression springs 37 and carry abutment members 36 upwardly and forwardly so as to contact the upper surface of the stationary tracks 34. Upon further continued forward motion of the crank 30, the abutment members 36 will slide along the tracks until the arms and blade reach the uppermost dotted line position immediately following which the abutment members 36 will fall past the outer edges of fixed crank 34 and again fall to the lower position in readiness for the rock-scooping action. It will be noted that the return movement of the arms is effected together with a lifting movement thereof which assists in carrying the blade 32 forwardly. Unlike a fixed fulcrum device in contact with the arms themselves, the action of the abutment members sliding along the track 34 is such as not to cause sudden increase and decrease in the pressure exerted upon the arms in order to effect the scooping action and the subsequent guided action for clearing the teeth and rocks upon the return stroke. Thus where a fixed fulcrum point is in contact with arms 31, the power required to slide the arms therealong becomes increasingly great so that the removable lever arms at either side of the fulcrum point will change in ratio. I have found, on the other hand, that the guiding track means for sliding the abutment member therealong will avoid these sudden changes in pressure and power requirements. The backward stroke of the arms 31 and blade 32 takes place in the most natural and efficient part of the crank cycle so that a maximum of work may be accomplished in lifting the rocks with a minimum of power applied to the crank. Likewise, there is little opportunity for rocks to become lodged in the teeth or tines 19 or to become inter-locked with any projections or spaced in the reciprocable member itself. The single plane of tines and plane blade 32 offer no opportunity for rocks to become lodged therein or otherwise to become stuck while being moved upwardly and rearwardly along the plane of the tines.

As the rocks are being collected by the rock-scooping assembly, the conveyor 39 moves them laterally and outwardly until they fall into the rock-accumulator portion 56. When a sufficient accumulation of rocks has been effected, the forward progress of the apparatus is stopped and the clutch 49 is reversed through manual actuation of rod 55. This operation will disengage the rock-scooping assembly and the rock pick-up conveyor but will engage the rock-discharge conveyor which underlies the accumulator 56. The accumulation of rocks will then be discharged from conveyor belt 57 laterally from the entire apparatus so as to pile them upon the ground beneath the discharge conveyor in a rock pile or may be discharged into a separate wagon from the conveyor for removing from the field.

It may thus be seen that I have devised an efficient and economical apparatus for clearing fields of rocks while at the same time providing for intermittent discharge of an accumulation of the rocks within the apparatus. The specific arrangement of teeth and rock-scooping assembly is such as to minimize the possibility of jamming and sticking of the rocks during collection thereof.

It will of course be understood that various changes may be made in the form, details, arrangement and proportions of the various parts without departing from the scope of my invention.

What I claim is:

1. In an apparatus for collecting rocks from the surface terrain, the combination of a supporting structure having ground-contacting members such as wheels, a rock-scooping assembly secured to the supporting structure and having fixed teeth lying in a downwardly and forwardly disposed plane, a reciprocable blade for scraping a batch of rocks upwardly toward a discharge, and guide mechanism comprising track means mounted in diverging relation with the plane of the fixed teeth and having a resilient portion interposed at the beginning of divergence between said track means and said plane whereby the blade in its backward operating stroke will contact uniformly the plane of the teeth and upon its forward return stroke will be guided over said resilient portion onto said track means, above and in spaced clearance with said plane.

2. In an apparatus for collecting rocks from the surface of the terrain, the combination of a supporting structure having ground-contacting members such as wheels, a rock-scooping assembly secured to the supporting structure and having fixed teeth lying in a downwardly and forwardly disposed plane, a reciprocable blade for scraping a batch of rocks upwardly toward a discharge, and a cooperative guide mechanism comprising track means mounted in diverging relation with the plane of the fixed teeth and having a resilient actuator at the juncture thereof, and abutment means connected with said blade for sliding engagement with the track means whereby the blade in its backward operating stroke will contact uniformly the plane of the teeth and upon its forward return stroke will be guided thereabove by said resilient actuator onto said track means in spaced clearance with said plane.

References Cited in the file of this patent
UNITED STATES PATENTS

| 533,514 | White et al. | Feb. 5, 1895 |
| 965,115 | Moore | July 19, 1910 |
| 1,593,952 | Ribbans | July 27, 1926 |
| 2,364,308 | Niewendorp | Dec. 5, 1944 |